United States Patent [19]

Bauer

[11] 4,237,933
[45] Dec. 9, 1980

[54] REVERSING VALVE CONSTRUCTION AND PARTS THEREFOR AND METHODS OF MAKING THE SAME

[75] Inventor: Werner R. Bauer, Radnor, Pa.

[73] Assignee: Robertshaw Controls Company, Richmond, Va.

[21] Appl. No.: 959,741

[22] Filed: Nov. 13, 1978

Related U.S. Application Data

[62] Division of Ser. No. 825,956, Aug. 19, 1977, abandoned.

[51] Int. Cl.³ ............................................. F16K 11/07
[52] U.S. Cl. .......................... 137/625.63; 137/625.29; 251/176; 62/324 A
[58] Field of Search ...................... 137/625.25, 625.63, 137/625.66, 625.29; 251/186, 182, 183, 189, 171, 175, 176; 62/324 A, 160

[56] References Cited

U.S. PATENT DOCUMENTS

| | | | |
|---|---|---|---|
| 2,889,569 | 6/1959 | Riester | 251/176 X |
| 2,976,701 | 3/1961 | Greenawalt | 137/625.29 X |
| 3,032,312 | 5/1962 | Greenawalt | 251/356 |
| 3,056,574 | 10/1962 | Greenawalt | 137/625.29 X |
| 3,150,503 | 9/1964 | Heidorn | 62/160 X |
| 3,349,800 | 10/1967 | Herion | 137/625.66 |
| 3,357,453 | 12/1967 | Mingrone et al. | 137/625.63 |
| 3,448,959 | 6/1969 | McHale | 251/31 |
| 3,642,248 | 2/1972 | Benware | 251/176 X |
| 3,985,154 | 10/1976 | Hargraves | 137/625.29 |

Primary Examiner—Arnold Rosenthal
Attorney, Agent, or Firm—Candor, Candor & Tassone

[57] ABSTRACT

A reversing valve construction having a housing provided with a chamber carrying a movable piston-like valve member therein that controls ports of a valve seat of the housing through the relative position of a cavity of the valve member relative to the ports. The ports comprise first, second and third ports that all face in the same direction at the valve seat and are disposed in spaced apart and straight line relation and the cavity faces the ports and bridges the first and second ports while exposing the chamber to the third port when the valve member is in one position thereof and bridges the second and third ports while exposing the chamber to the first port when the valve member is in another position thereof. A flexible sealing annular member is disposed between the valve member and the valve seat and surrounding the cavity to be movable relative thereto to seal the cavity of the valve member to the valve seat while permitting sliding movement therebetween. A biasing member is operatively associated with the valve member and the flexible sealing member to urge and flex the sealing member relative to the valve member into sealing engagement with the valve seat so as to tend to sealingly conform the flexible sealing member to the contour of the valve seat.

16 Claims, 13 Drawing Figures

REVERSING VALVE CONSTRUCTION AND PARTS THEREFOR AND METHODS OF MAKING THE SAME

CROSS-REFERENCE TO RELATED APPLICATION

This application is a divisional patent application of its copending parent patent application, Ser. No. 825,956, filed Aug. 19, 1977 now abandoned.

BACKGROUND OF THE INVENTION

1. Field of the Invention

This invention relates to an improved reversing valve construction and parts therefor as well as to methods for making such a reversing valve construction and the parts therefor.

2. Prior Art Statement

It is well known that reversing valve constructions for heat pump systems and the like have been provided wherein each includes a housing means carrying a movable piston-like valve member that controls port means of a valve seat means of the housing means through the relative position of cavity of the valve member relative to the port means.

For example, see the following four U.S. Pat. Nos.:
3,032,312—Greenawalt
3,056,574—Greenawalt
3,357,453—Mingrone et al
3,985,154—Hargraves Each reversing valve construction of the above four patents appears to have a rigid and non-flexible valve member disposed in sliding contact with its cooperating valve seat surface, the first three above patents each having the valve seat means thereof formed by a separate part disposed and secured in the housing means and being provided with a flat surface against which a flat surface of the movable valve member engages and slides in sealing relation therewith whereas the above patent to Hargraves has the valve seat means formed from a non-formed part of a cylindrical tubular housing member so as to be provided with an arcuate surface against which an arcuate surface of the valve member slides in sealing relation therewith.

Actual production devices that appear similar to the above four patents were examined and those similar to Mingrone et al and Hargraves were found to have rigid metallic surfaces of the valve members to be disposed in sliding relation with respective metallic surfaces of the valve seat means, the device similar to the patent to Greenawalt, U.S. Pat. No. 3,032,312 was found to have a non-flexible and rigid plastic annular part forming the sliding surface of the valve member and being captured at its inner and outer peripheries by metallic retainers of the valve member whereby the entire valve member is rigid, and the device similar to the patent to Greenawalt, U.S. Pat. No. 3,056,574 was found to have the entire valve member formed of plastic material and of such a thickness that the same is not flexible.

It is also known to provide an outwardly biased annular sealing member around a cavity in a valve member to seal the same to a valve seat means.

For example, see the following U.S. Pat. No.:
3,349,800—Herion et al

It appears that the annular sealing member of the above patent to Herion et al always surrounds a single port in the valve seat means to always interconnect that single port to the cavity of the valve member.

It also is known to outwardly bias a valve sealing member with a resilient O-ring like member disposed between the valve member and the valve sealing member.

For example, see the following U.S. Pat. No.:
3,642,248—Benware

It appears that the sealing member of the above patent to Benware is disposed in an annular recess of a valve member and is urged outwardly from that recess to seal against a valve seat means by a resilient O-ring member also disposed in the recess between the valve member and the sealing member.

SUMMARY OF THE INVENTION

The efficiency of each such reversing valve constructions depends upon its leakage and pressure drop characteristics across the valve member thereof so that the closer the tolerances can be made between the mating surfaces of the valve member and the valve seat means, the more efficient is the resulting reversing valve construction.

Thus, it was found according to the teachings of this invention that improved sealing means can be provided between such a movable valve member and its cooperating valve seat means to improve the efficiency of the resulting reversing valve construction.

In particular, one embodiment of this invention provides a flexible annular sealing member disposed between the valve member of the reversing valve construction and the valve seat means thereof and surrounding the cavity of the valve member to seal the cavity of the valve member to the valve seat means while permitting sliding movement therebetween. The sealing member is movable between the valve member and the valve seat means, the flexible sealing member being urged and flexed relative to the undue member into sealing engagement with the valve seat means by biasing means that is operatively associated with the valve member and the flexible sealing member so as to tend to sealingly conform the flexible sealing member to the contour of the valve seat means.

Another feature of this invention is to provide an improved valve seat means for such prior known reversing valve constructions as well as for the reversing valve constructions of this invention.

In particular, one embodiment of this invention provides any one of the aforementioned reversing valve constructions with a valve seat means that is an integral and homogeneous part of the tubular housing means thereof while still having a substantially flat valve seat surface to cooperate with the movable piston-like valve member.

Accordingly, it is an object of this invention to provide an improved reversing valve construction having one or more of the novel features of this invention as set forth above or hereinafter shown or described.

Another object of this invention is to provide a method of making such a reversing valve construction, the method of this invention having one or more of the novel features of this invention as set forth above or hereinafter shown or described.

Another object of this invention is to provide an improved part for such a reversing valve construction or the like, the improved part of this invention having one or more of the novel features of this invention as set forth above or hereinafter shown or described.

Another object of this invention is to provide a method for making such an improved part, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 2 is a cross-sectional view taken on line 2—2 of FIG. 1 and illustrates the prior art reversing valve construction of FIG. 1 in a heat pump system or the like.

DESCRIPTION OF THE PREFERRED EMBODIMENTS

While the various features of this invention are hereinafter described and illustrated as being particularly adapted to provide a reversing valve construction for a heat pump system, it is to be understood that the various features of this invention can be utilized singly or in any combination thereof to provide a reversing valve construction for other systems as desired.

Therefore, this invention is not to be limited to only the embodiments illustrated in the drawings, because the drawings are merely utilized to illustrate one of the wide variety of uses of this invention.

Figure 1:
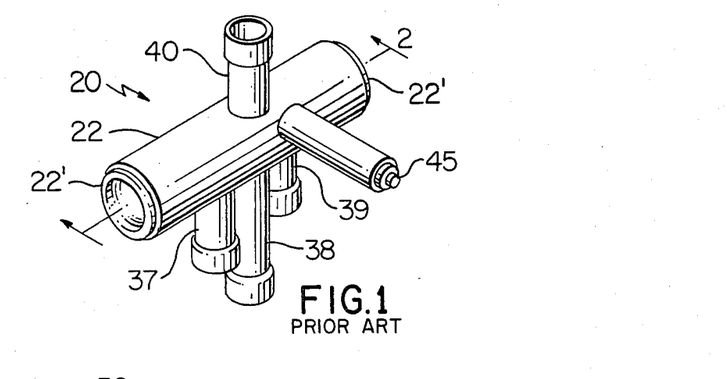
FIG. 1 is a perspective view of a prior art reversing valve construction.
Figure 2:
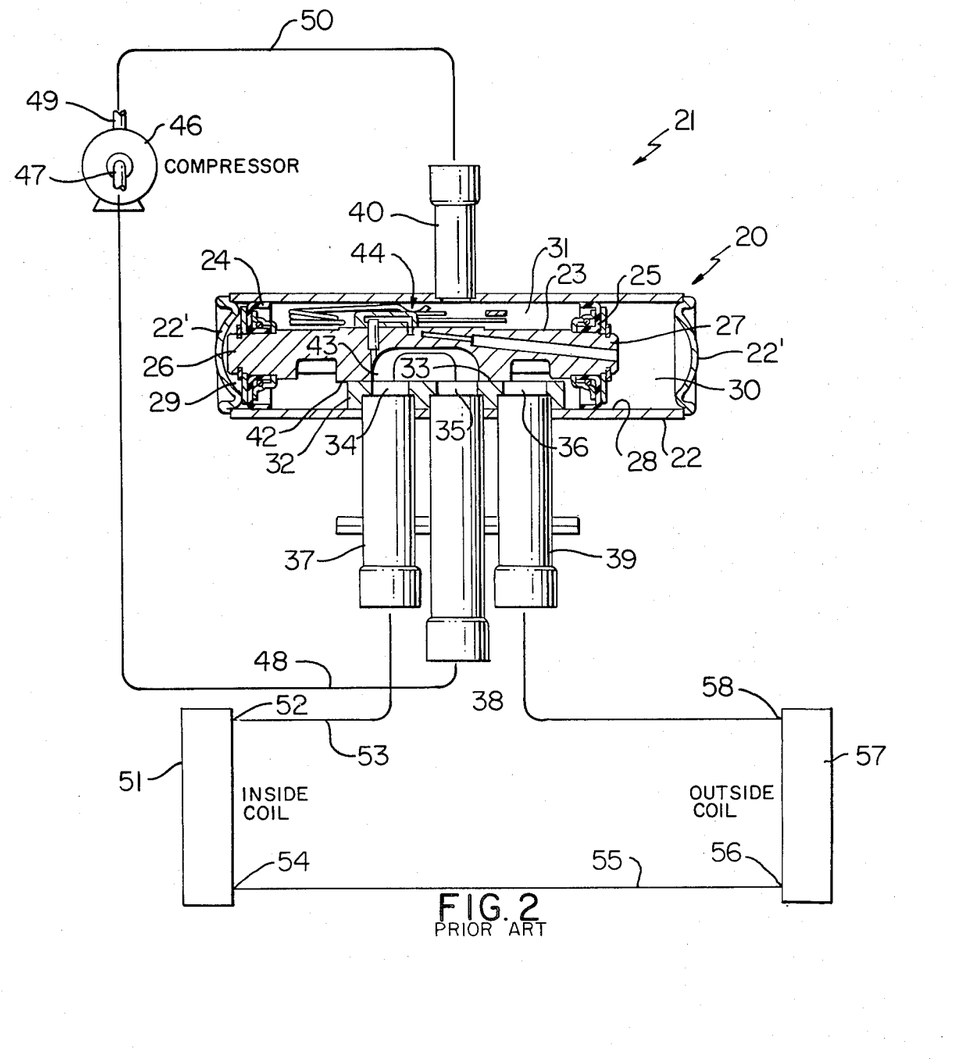

Referring now to FIGS. 1 and 2, a prior known reversing valve construction is generally indicated by the reference numeral 20 and is illustrated in FIG. 2 for controlling a heat pump system that is generally indicated by the reference numeral 21, the reversing valve construction 20 being fully disclosed and claimed in the aforementioned U.S. Pat. No. 3,357,453 to Mingrone et al which provides all of the details of the structure and operation of the reversing valve construction 20 so that the same need not be fully described herein.

However, in order to understand the improved features of this invention, the prior known reversing valve construction 20 will be generally described in connection with the heat pump system 21.

In particular, the prior known reversing valve construction 20 includes a metallic tubular housing member 22 having a movable metallic piston-like valve member 23 slidingly disposed therein and having piston portions 24 and 25 disposed at the opposed ends 26 and 27 thereof to sealingly cooperate with the internal peripheral surface 28 of the tubular housing member 22 and end closures 22' to define end chambers 29 and 30 therewith and separating the end chambers 29 and 30 from a central chamber 31 thereof.

A metallic valve seat member 32 is secured in the housing member 22 and defines a flat valve seat surface 33 that is interrupted by three ports 34, 35 and 36 respectively fluidly interconnected to metallic tubular connectors 37, 38 and 39 while a similar metallic tubular connector 40 is disposed in fluid communication with a port 41 formed in the tubular housing member 22 opposite the valve seat 32 as illustrated.

The movable valve member 23 has a lower flat surface 42 disposed in sliding and sealing engagement with the flat surface 33 of the valve seat 32 and is interrupted by a cavity 43 that defines a passage means which is adapted to fluidly and sealingly interconnect the ports 34 and 35 of the valve seat 32 together when the valve member 23 is disposed in the position illustrated in FIG. 2 while the port 36 is permitted to be disposed in fluid communication with the central chamber 31 of the housing means 32 and thus, to the tubular connector 40 as illustrated. However, when the valve member 23 is moved to the right in FIG. 2, the passage means 43 of the valve member 23 fluidly and sealingly interconnects the ports 35 and 36 together while permitting the port 34 to be disposed in fluid communication with the internal chamber 31 of the housing means 22 and, thus, in fluid communication with the tubular connector 40 for a purpose hereinafter described.

The movement of the valve member 23 relative to the housing means 22 is accomplished by directing fluid pressure to either the chamber 29 or the chamber 30 by means of a movable pilot valve means 44 carried on the valve member 23 and being controlled by a solenoid operated plunger 45, FIG. 1, in a manner fully set forth in the aforementioned U.S. Pat. No. 3,357,453.

The heat pump system 21 includes a refrigerant compressor 46 having the inlet side 47 thereof interconnected by a passage 48 to the tubular connector 38 while its outlet side 49 is interconnected by a passage 50 to the tubular connector 40.

An inside coil 51 of the heat pump system 21 has one side 52 thereof interconnected by a passage 53 to the tubular connector 37 while the other side 54 of the inside coil 51 is interconnected by an expansion capillary passage 55 to one side 56 of an outside coil 57. The other side 58 of the outside coil 57 is interconnected by a passage 59 to the tubular connector 39.

When the valve member 23 of the reversing valve 20 of the system 21 is disposed in the position illustrated in FIG. 2 by means of the pilot valve means 44 directing fluid pressure to the end chamber 30 while exhausting the end chamber 29, the heat pump system 21 is acting in its cooling cycle as the hot gas output from the output side 49 of the compressor 40 is being directed through the chamber 31 of the reversing valve 20 into the tubular connector 39 and, thus, to the side 58 of the outside coil which then returns through the expansion capillary passage 55 to the inside coil 51 and through the interconnected ports 34 and 35 of the valve seat 52 to the inlet side 47 of the compressor 46 whereby the inside coil 51 provides its cooling function.

Should it be desired to reverse the heat pump system 21 to a heating cycle thereof, the pilot valve means 44 is actuated so as to direct fluid pressure to the end chamber 29 of the reversing valve 20 while exhausting the end chamber 30 thereof to move the movable valve member 23 to the right in FIG. 2 to now interconnect the ports 35 and 36 through the passage 43 of the valve member 23. In this manner, the flow of hot gases from the outlet 49 of the compressor 46 is now directed to the port 34 of the valve seat 32 and, thus, to the side 52 of the inside coil which now performs its heating function. The return from the inside coil 51 is directed by the expansion capillary passage 55 to the outside coil 57 and, thus, from the outside coil 57 through the interconnected passages 36 and 35 of the valve seat 32 back to the inlet side 47 of the compressor 46 in a manner well known in the art.

Thus, it can be seen that the reversing valve construction 20 can be utilized to reverse the cycle of operation of heat pump system 21 in the above manner.

However, the efficiency of the reversing valve construction 20 depends upon leakage and pressure drop across the valve member 23 caused by the high pressure in chamber 31 and the low pressure in the passage means 43 of the valve member 23 and this is controlled by the sealing effect between the cooperating flat surfaces 42 and 33 of the valve member 23 and valve seat 32 as the flow of low pressure fluid continuously takes place through the passage means 43 of the valve member 23 and its particular pair of sealed ports 34 and 35 or 35 and 36 while the chamber 31 containing the valve member 23 is under a high pressure as long as the system 21 is operating.

As previously stated, it was found according to the teachings of this invention that improved sealing can be provided between the movable valve member 23 and the valve seat 32 of the prior known reversing valve construction 20 to improve upon the efficiency thereof.

Figure 3:
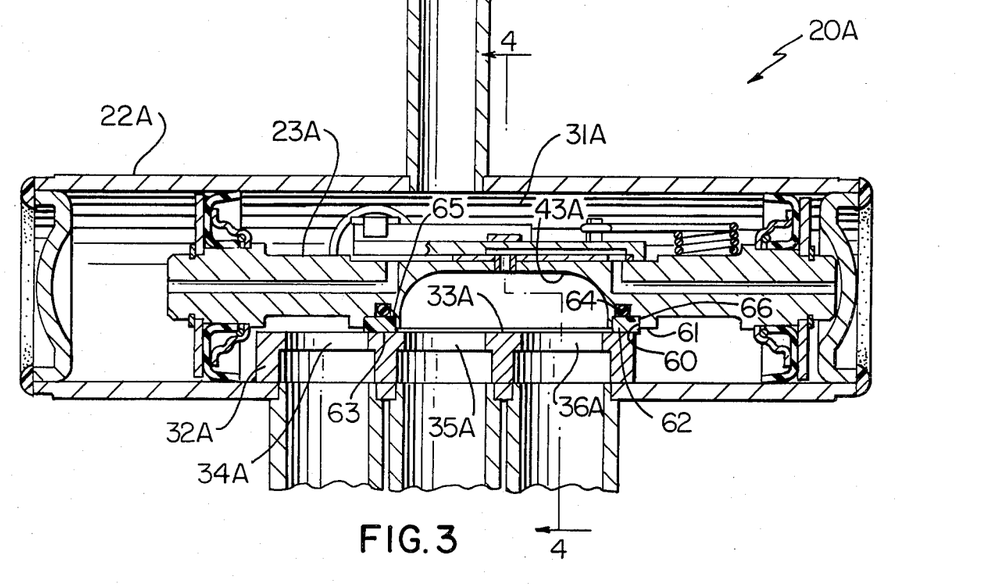
FIG. 3 is an enlarged cross-sectional view similar to FIG. 2 and illustrates one of the improved reversing valve constructions of this invention.
Figure 4:
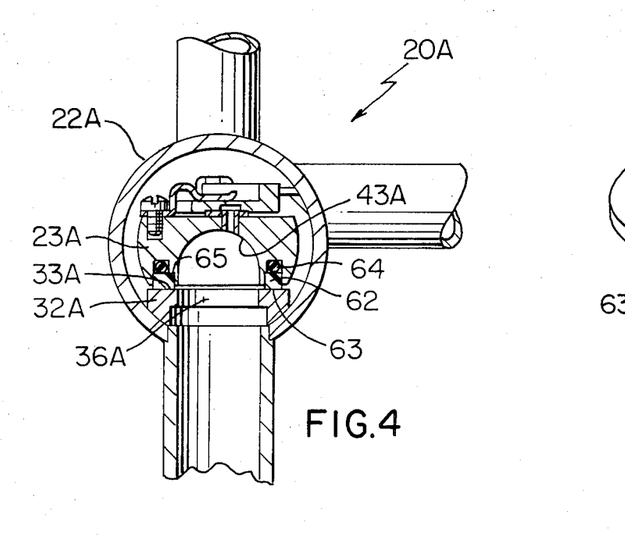
FIG. 4 is a cross-sectional view taken on line 4—4 of FIG. 3.

Accordingly, such an improved reversing valve construction of this invention is generally indicated by the reference numeral 20A in FIGS. 3 and 4 and parts thereof similar to the reversing valve construction 20 previously described are indicated by like reference numerals followed by the reference letter "A".

As illustrated in FIGS. 3 and 4, the reversing valve construction 20A of this invention includes the tubular housing means 22A formed of metal or any other suitable material carrying the separate valve seat member 32A formed of metal or any other suitable material and is provided with the flat valve seat surface 33A which is interrupted by the ports 34A, 35A and 36A as previously described.

However, the movable valve member 23A of the reversing valve construction 20A of this invention has an annular recess means 60 formed in the lower surface 61 thereof and completely surrounding the cavity or passage means 43A thereof and receiving an annular flexible sealing member 62 therein that is adapted to have its lower flat surface 63 disposed in sliding and sealing engagement against the flat surface 33A of the valve seat 32A as illustrated in FIGS. 3 and 4.

In addition, an annular biasing means 64 is disposed in the recess means 60 between the valve member 23A and the upper side 65 of the sealing member 62 to not only resiliently urge the sealing member 62 into sealing engagement with the flat surface 33A of the valve seat member 32A and thereby take up any tolerances between a shoulder 66 of the recess means 60 and the surface 33A of the valve seat member 32A, but also to provide fluid sealing between the valve member 23A and flexible sealing member 62 whereby an effective sealing arrangement is provided for the valve member 23A by the flexible sealing member 62 and biasing means 64.

Figure 5:
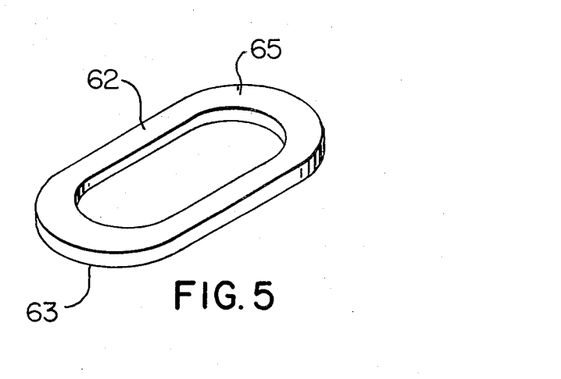
FIG. 5 is a perspective view of the improved sealing member of this invention that is utilized in the reversing valve construction of FIGS. 3 and 4.

While the annular flexible sealing member 62 can be formed in any desired flexible material, the same can be made from polytetrafluoroethylene sold under the tradename TEFLON-TFE by the E. I. Du Pont de Nemours, Inc., of Wilmington, Delaware, and must be sufficiently thin in order to be flexible, such as approximately 0.078 of an inch thick or thinner for the reversing valve arrangement illustrated.

The resilient biasing member 64 can comprise a rubber-like O or square ring of sufficient resiliency so that the same will continuously push and flex the flexible sealing member 62 against the flat surface 33A of the metal valve member 32A, take up the tolerance between the piston valve member 23A and the internal peripheral surface 28A of the tubular valve member 22A, cause the lower surface 63 of the flexible sealing member 62 to fully conform to the contour of the surface 33A of the valve seat 32A, and will seal the high pressure side of the chamber 31A from the passage 43A of the valve member 23A as well as from the particular pair of ports 34A and 35A or 35A and 36A being interconnected together by the passage means 43A.

Therefore, it can be seen that the reversing valve construction 20A of this invention can be formed by the method of this invention in the manner previously described to include flexible sealing means between the valve member 23A and the valve seat 32A so that the reversing valve construction 20A can effectively operate in a manner now to be described.

As the valve member 23A of the valve construction 20A is shifted from left to right or right to left in the tubular housing means 22A in the same manner and for the same purpose previously described, it can be seen that the flat surface 63 of the flexible sealing member 62 slides in sealing engagement on the flat surface 33A of the valve seat member 32A to seal the resulting interconnected ports 35A and 36A or 34A and 35A from the intermediate pressurized chamber 31A of the tubular valve member 22A while fluidly interconnecting the particular ports together as previously set forth, the flat surface 63 of the flexible sealing member 62 being continuously urged and flexed into sealing engagement with the flat surface 33A of the valve seat member 32A by the biasing means 64 so that the surface 63 of the annular sealing member 62 conforms to the contour of the surface 33A of the valve seat member 32A in a more effective manner than the cooperating flat metallic surfaces 42 and 33 of the valve member 23 and valve seat member 32 of the previously described prior known reversing valve construction 20.

Therefore, it can be seen that the reversing valve construction 20A of this invention provides a flexible sealing member 62 disposed between the valve member 23A and the valve seat means 32A to seal the passage means 43A of the movable piston-like valve member 23A to the valve seat means 32A while permitting sliding movement therebetween, the biasing means 64 being operatively associated with the valve member 23A and with the flexible sealing member 62 to continuously urge the flexible sealing member 62 into sealing engagement with the valve seat means 32A while fluid sealing the flexible member 62 to the valve member 23A.

While the biasing means 64 of the reversing valve construction 20A of this invention is illustrated as being O-shaped in cross-section, it is to be understood that the biasing means 64 could have any desired configuration.

Figure 6:
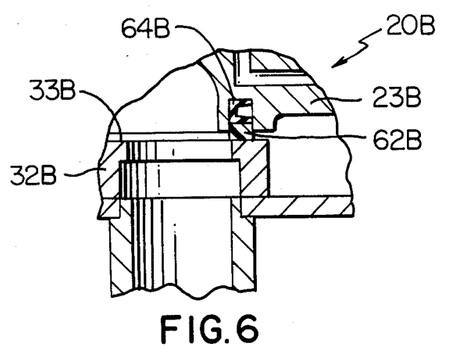
FIG. 6 is a fragmentary cross-sectional view similar to FIG. 3 and illustrates another embodiment of the reversing valve construction of this invention.

For example, another reversing valve construction of this invention is generally indicated by the reference numeral 20B in FIG. 6 and parts thereof similar to the reversing valve construction 20A previously described are indicated by like reference numerals followed by the reference letter "B".

As illustrated in FIG. 6, the biasing means 64B for the flexible sealing member 62B is formed with a substantially U-shaped cross-sectional configuration so as to provide the biasing function for continuously urging the flexible sealing member 62B into sealing engagement with the flat surface 33B of the valve seat means 32A for the purposes previously described, the high fluid pressure in the chamber 31B assisting in the fluid sealing of the biasing means 64B as the fluid pressure tends to spread apart the legs of the U-shaped biasing means 64B.

Also, it is to be understood that the biasing means for the flexible sealing means of this invention could be an integral part of the flexible sealing means if desired.

Figure 7:
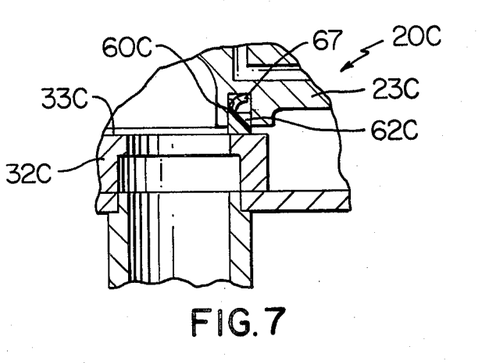
FIG. 7 is a view similar to FIG. 6 and illustrates another embodiment of the reversing valve construction of this invention.

For example, reference is now made to FIG. 7 wherein another reversing valve construction of this invention is generally indicated by the reference numeral 20C and parts thereof similar to the reversing valve constructions 20A and 20B previously described are indicated by like reference numerals followed by the reference letter "C".

As illustrated in FIG. 7, it can be seen that the reversing valve construction 20C has the resilient annular sealing member 62C thereof provided with an outwardly directed annular tongue 67 which normally extends substantially at a right angle relative thereto but when received in the recess 60C will be bent and be held under compression and thereby provide the biasing force to urge the main body of the sealing means 62C into sealing engagement with the flat surface 33C of the valve seat means 32C as illustrated, the high fluid pressure in the chamber 31C assisting in the fluid sealing of the tongue 67 as the fluid pressure acts against the tongue 67 in a direction to tend to unbend the tongue 67.

Of course, instead of the integral tongue 67 being rectangular in cross-section, it could more closely resemble an "O" ring or other configuration while still being integral with the flexible sealing member 62C, as desired.

In this manner, it can be seen that the reversing valve constructions 20B and 20C of FIGS. 6 and 7 each will operate in the same manner as the reversing valve construction 20A previously described to provide an effective sealing means between the respective valve members 23B and 23C and their valve seats 32B and 32C.

It may be desired to utilize the sealing feature of this invention in such a manner that a flat valve seat means need not be provided for the housing means with the piston-like valve member still functioning with the improved seal means of this invention.

Figure 8:
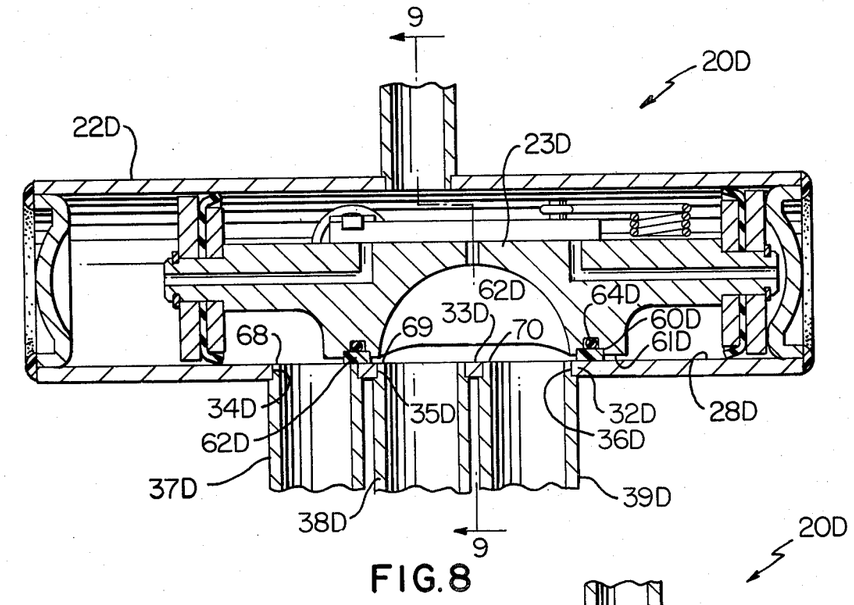
FIG. 8 is a view similar to FIG. 3 and illustrates another embodiment of the reversing valve construction of this invention.
Figure 9:
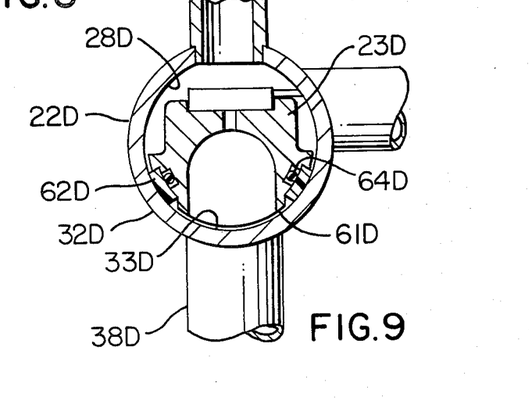
FIG. 9 is a cross-sectional view taken on line 9—9 of FIG. 8.

For example, reference is now made to FIGS. 8 and 9 wherein another reversing valve construction of this invention is generally indicated by the reference numeral 20D and parts thereof similar to the reversing valve constructions 20, 20A, 20B, and 20C are indicated by like reference numerals followed by the reference letter "D".

As illustrated in FIGS. 8 and 9, it can be seen that the tubular housing member 22D does not have a separate valve seat member disposed therein as part of the internal peripheral surface 28D thereof provides the valve seat means 32D and thereby has an arcuate surface 33D that is interrupted by the openings or ports 34D, 35D and 36D which respectively receive cooperating ends 68, 69 and 70 of the tubular connectors 37D, 38D and 39D as illustrated.

The lower surface 61D of the valve member 23D is shaped with an arcuate cross-section as illustrated in FIG. 9 which is disposed closely adjacent the arcuate surface 33D of the valve seat means 32D and is interrupted by the annular groove 60D that receives the flexible sealing member 62D and biasing means 64D so that the flexible sealing member 62D will perform its sealing function with the valve seat surface 33D in the manner previously described through the continuous urging of the biasing means 64D in the manner previously described.

Of course, the sealing means of this invention as illustrated in FIG. 6 or FIG. 7 can be utilized with the valve member 23D of the reversing valve 20D of FIGS. 8 and 9 if desired.

However, it has been found that since the sealing member 62D must flex into the arcuate condition illustrated, the same should be more flexible than when used for flat valve seat surfaces. Thus when the sealing member 62D is made of the same material at the sealing member 62 previously described, it has been found that the same should be approximately 0.030 of an inch thick or thinner.

Since the operation of the reversing valve construction 20D is the same as the reversing valve constructions 20A, B and C previously described, the operation of the reversing valve construction 20D need not be described.

The use of the flexible sealing means 62D in combination with the arcuate valve seat means 32D is further disclosed and claimed in applicant's copending patent application, Ser. No. 825,957 filed Aug. 19, 1977, now U.S. Pat. No. 4,144,905, dated Mar. 20, 1979.

Figure 10:
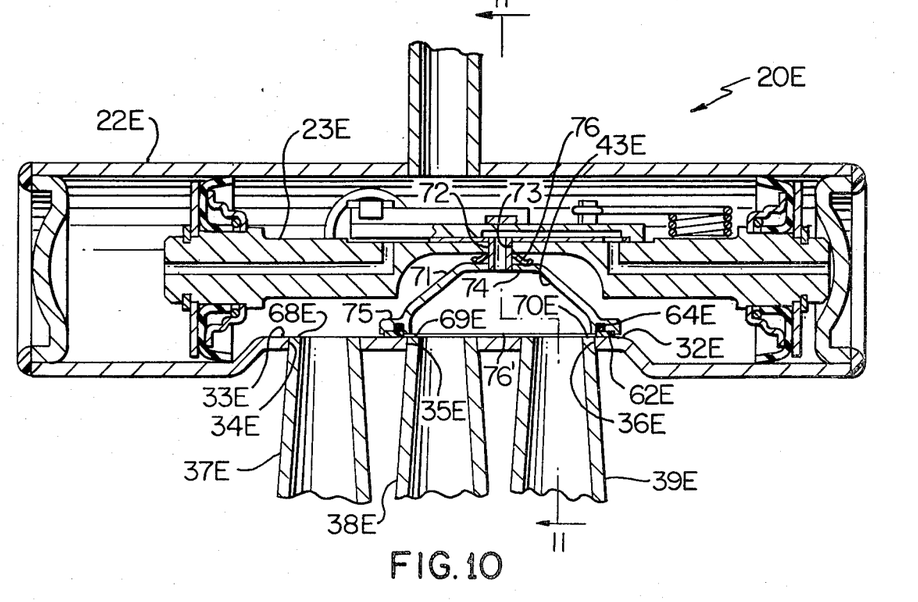
FIG. 10 is a view similar to FIG. 3 and illustrates another embodiment of the reversing valve construction of this invention.
Figure 11:
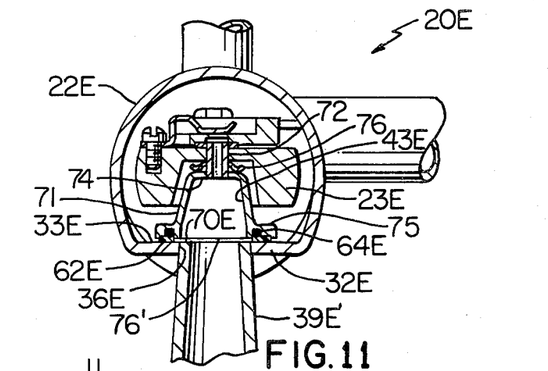
FIG. 11 is a cross-sectional view taken on line 11—11 of FIG. 10.

Referring now to FIGS. 10 and 11, another reversing valve construction of this invention is generally indicated by the reference numeral 20E and parts thereof similar to the reversing valve constructions 20, 20A, 20B, 20C and 20D are indicated by like reference numerals followed by the reference letter "E".

The reversing valve construction 20E of FIGS. 10 and 11 has the tubular housing means 22E formed by a method of this invention illustrated in FIGS. 12 and 13 in a manner hereinafter described to define an integral and homogeneous valve seat part 32E provided with a flat valve seat surface 33E that is interrupted by ports 34E, 35E and 36E which respectively receive suitably formed ends 68E, 69E, and 70E of the tubular connectors 37E, 38E and 39E as illustrated.

The valve member 23E has a movable cup-shaped part 71 provided with a tubular extension 72 which is slidingly received in an opening 73 formed in the valve member 23E, the tubular member 72 being carried by the closed end 74 of the cup-shaped member 71 while an annular flexible sealing member 62E and its associated biasing means 64E are carried by an outwardly turned annular flange 75 at the open end 76' of the cup-shaped member 71 as illustrated for the sealing purposes previously described.

A resilient washer like spring member 76 is disposed between the valve member 23E and the closed end 74 of the cup-shaped member 71 to continuously urge the cup-shaped part 71 and, thus, the flexible sealing member 62E into sealing engagement with the flat surface 33E of the valve seat means 32E as illustrated whereby the resulting chamber 43E of the cup-shaped member 71 is adapted to interconnect either the tubular connectors 38E and 39E or the tubular connectors 37E and 38E together depending upon the position of the piston-like valve member 23E in the tubular housing means 22E.

In this manner, the biasing means 64E for the sealing means 62E performs the same function as the biasing means 64, 64E, 67, or 64D previously described while the spring means 76 takes up any loss of wear of the sealing member 62E so that the full force of the biasing means 64E can be utilized for sealing purposes and not wear take up purposes as would be the case if the spring means 76 were not provided.

Thus, it can be seen that the reversing valve construction 20E of this invention operates in the same manner as the reversing valve constructions 20A, 20B, 20C and 20D previously described.

Figure 12:
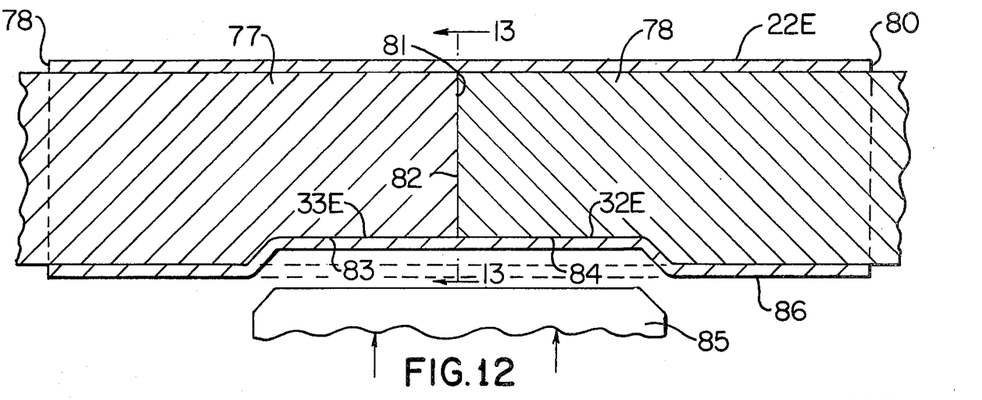
FIG. 12 is a schematic view illustrating the method of this invention for forming the improved housing means of the reversing valve construction of FIG. 10.
Figure 13:
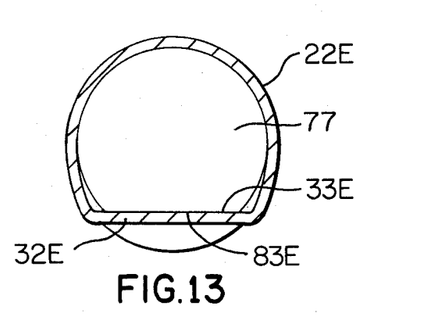
FIG. 13 is a cross-sectional view taken on line 13—13 of FIG. 12.

In order to form the unique valve seat means 32E of the tubular housing means 22E for the reversing valve 20E previously described, a unique method of this invention is provided and is schematically illustrated in FIG. 12 wherein the cylindrical tubular housing member 22E formed of metal or any other suitable material initially has a pair of forming members 77 and 78 respectively disposed through the opposed open ends 79 and 80 thereof so that the inner ends 81 and 82 of the forming members 77 and 78 abut each other and have stepped parts 83 and 84 which will cooperate with a punch member 85 to deform a section of the cylindrical side wall means 86 of the tubular housing means 22E from the normal configuration thereof illustrated by dash lines in FIG. 12 into the formed valve seat means 32E as illustrated with an upper flat surface 33E as illustrated in FIG. 13. The flat surface 33E can be subsequently provided with the openings 68E-70E after the forming members 77 and 78 as well as the outside forming member 85 have been backed off of the thus deformed housing member 22E.

Therefore, it can be seen that the method of this invention illustrated in FIG. 12 can effectively form a flat surfaced valve seat means 32E within the housing means 22E without requiring the separate valve seat member 32 of the reversing valve construction 20 previously described so that the resulting housing means 22E of this invention is substantially less costly than the assembly of the housing means 22 and its interconnected valve seat member 32 previously described.

While the flexible sealing member of this invention and its associated biasing means have been illustrated and described as being assembled to their respective valve member in a recent means thereof, it is to be understood that such recess means can be suitably shaped to capture the flexible sealing member and its biasing means so as to be carried by their respective valve member. Also, the end caps 22 of the housing means could be threaded thereon so that the same could be removed to replace worn parts, such as a worn flexible member.

Therefore, it can be seen that this invention not only provides an improved reversing valve construction and method of making the same, but also this invention provides an improved housing means for such a reversing valve construction and the like and method of making the same.

While the forms and methods of this invention now preferred have been illustrated and described as required by the Patents Statute, it is to be understood that other forms and method steps can be utilized and still fall within the scope of the appended claims.

What is claimed is:

1. In a method of making a reversing valve construction having a housing means provided with a chamber carrying a movable piston-like value member therein that controls port means of a valve seat means of said housing means through the relative position of a cavity of said valve member relative to said port means, said port means comprising first, second and third ports that all face in the same direction at said valve seat means and are disposed in spaced apart and straight line relation and said cavity facing said ports and bridging said first and second ports while exposing said chamber to said third port when said valve member is in one position thereof and bridging said second and third ports while exposing said chamber to said first port when said valve member is in another position thereof, the improvement comprising the steps of disposing a flexible annular sealing member to be movable between said valve member and said valve seat means and surrounding said cavity to seal said cavity to said valve seat means while permitting sliding movement therebetween, and operatively associating biasing means with said valve member and said flexible sealing member to urge and flex said sealing member relative to said valve member and into sealing engagement with said valve seat means so as to tend to sealingly conform said flexible sealing member to the contour of said valve seat means.

2. A method of making a reversing valve construction as set forth in claim 1 and including the step of forming said valve member with an annular recess means therein surrounding said cavity thereof and for receiving said annular sealing member therein.

3. A method of making a reversing valve construction as set forth in claim 1 and including the step of forming said valve seat means to have a substantially flat surface against which said flexible sealing member engages.

4. A method of making a reversing valve construction as set forth in claim 3 and including the step of forming said valve member to also have a flat surface adjacent said flat surface of said valve seat means whereby said flexible sealing member is intermediate said flat surfaces.

5. A method of making a reversing valve construction as set forth in claim 2 and including the steps of forming said biasing means to also be annular, and disposing said annular biasing means in said annular recess means between said annular sealing member and said valve member.

6. A method of making a reversing valve construction as set forth in claim 5 and including the step of forming said annular biasing means from a resilient O-ring-like member.

7. A method of making a reversing valve construction as set forth in claim 5 and including the step of forming said annular biasing means as part of said annular sealing member.

8. A method of making a reversing valve construction as set forth in claim 5 and including the step of disposing said biasing means so as to also seal said flexible sealing member to said valve member about said passage means thereof.

9. A method of making a reversing valve construction as set forth in claim 8 and including the steps of forming said valve member with a part that is movable relative thereto while being carried thereby, disposing said flexible sealing member and said annular biasing means so as to be carried by said part, and disposing a spring means between said valve member and said part to tend to urge said part toward said valve seat means.

10. In a method of making a reversing valve construction having a housing means provided with a chamber carrying a movable piston-like valve member therein that controls port means of a valve seat means of said housing means through the relative position of a cavity of said valve member relative to said port means, said port means comprising first, second and third ports that all face in the same direction at said valve seat means and are disposed in spaced apart and straight line relation and said cavity facing said ports and bringing said first and second ports while exposing said chamber to said third port when said valve member is in one position thereof and bridging said second and third ports while exposing said chamber to said first port when said valve member is in another position thereof, the improvement comprising the steps of disposing a flexible annular sealing member between said valve member and said valve seat means and surrounding said cavity to seal said cavity to said valve seat means while permitting sliding movement therebetween, operatively associating biasing means with said valve member and said flexible sealing member to urge and flex said sealing member into sealing engagement with said valve seat means so as to tend to sealingly conform said flexible sealing member to the contour of said valve seat means, forming said valve member with an annular recess means therein surrounding said cavity thereof and for receiving said annular sealing member therein, forming said biasing means to also be annular, and disposing said annular biasing means in said annular recess means between said annular sealing member and said valve member.

11. A method of making a reversing valve construction as set forth in claim 10 and including the step of forming said annular biasing means from a resilient O-ring-like member.

12. A method of making a reversing valve construcion as set forth in claim 10 and including the step of forming said annular biasing means as part of said annular sealing member.

13. A method of making a reversing valve construction as set forth in claim 10 and including the step of disposing said biasing means so as to also seal said flexible sealing member to said valve member about said passage means thereof.

14. A method of making a reversing valve construction as set forth in claim 13 and including the steps of forming said valve member with a part that is movable relative thereto while being carried thereby, disposing said flexible sealing member and said annular biasing means so as to be carried by said part, and disposing a spring means between said valve member and said part to tend to urge said part toward said valve seat means.

15. A method of making a reversing valve construction as set forth in claim 10 and including the step of forming said valve seat means to have a substantially flat surface against which said flexible sealing member engages.

16. A method of making a reversing valve construction as set forth in claim 15 and including the step of forming said valve member to also have a flat surface adjacent said flat surface of said valve seat means whereby said flexible sealing member is intermediate said flat surfaces.

* * * * *